Aug. 30, 1932.    O. WERNER    1,874,214
BEACON AND AIR CURRENT INDICATOR
Filed Nov. 30, 1926    4 Sheets-Sheet 1
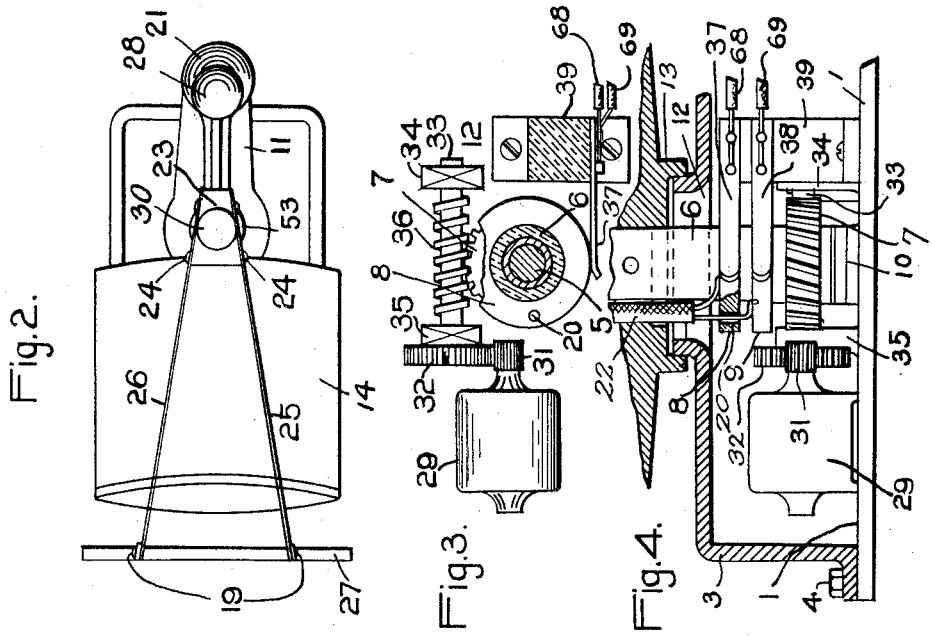
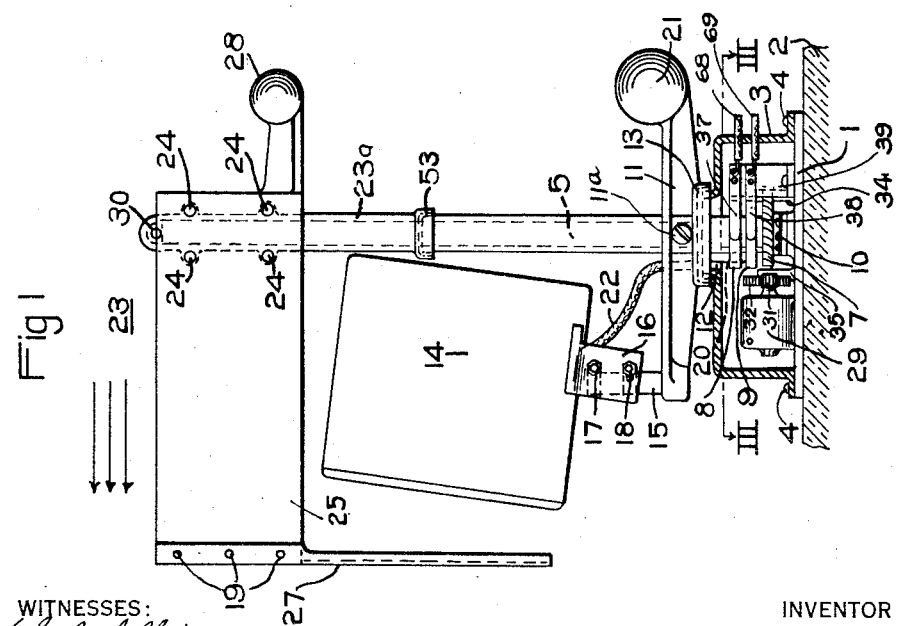
WITNESSES:
A. J. Schiefelbein.
Flournoy Corey
INVENTOR
Oscar Werner.
BY Chester G. Carr
ATTORNEY Aug. 30, 1932.    O. WERNER    1,874,214
BEACON AND AIR CURRENT INDICATOR
Filed Nov. 30, 1926    4 Sheets-Sheet 2
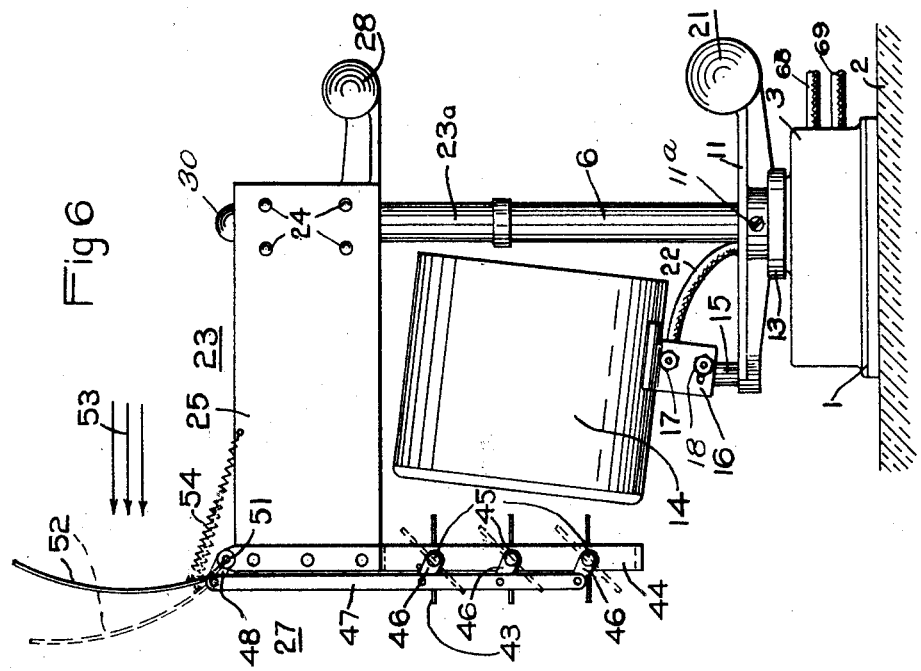
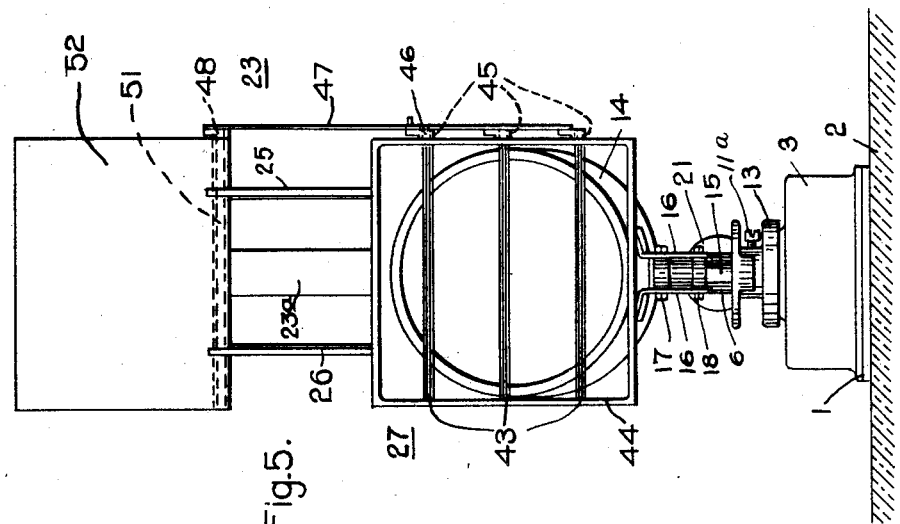
WITNESSES:
A. J. Schiefelbein
Flournoy Corey
INVENTOR
Oscar Werner.
BY
Wesley G. Carr
ATTORNEY Aug. 30, 1932. O. WERNER 1,874,214
BEACON AND AIR CURRENT INDICATOR
Filed Nov. 30, 1926 4 Sheets-Sheet 3
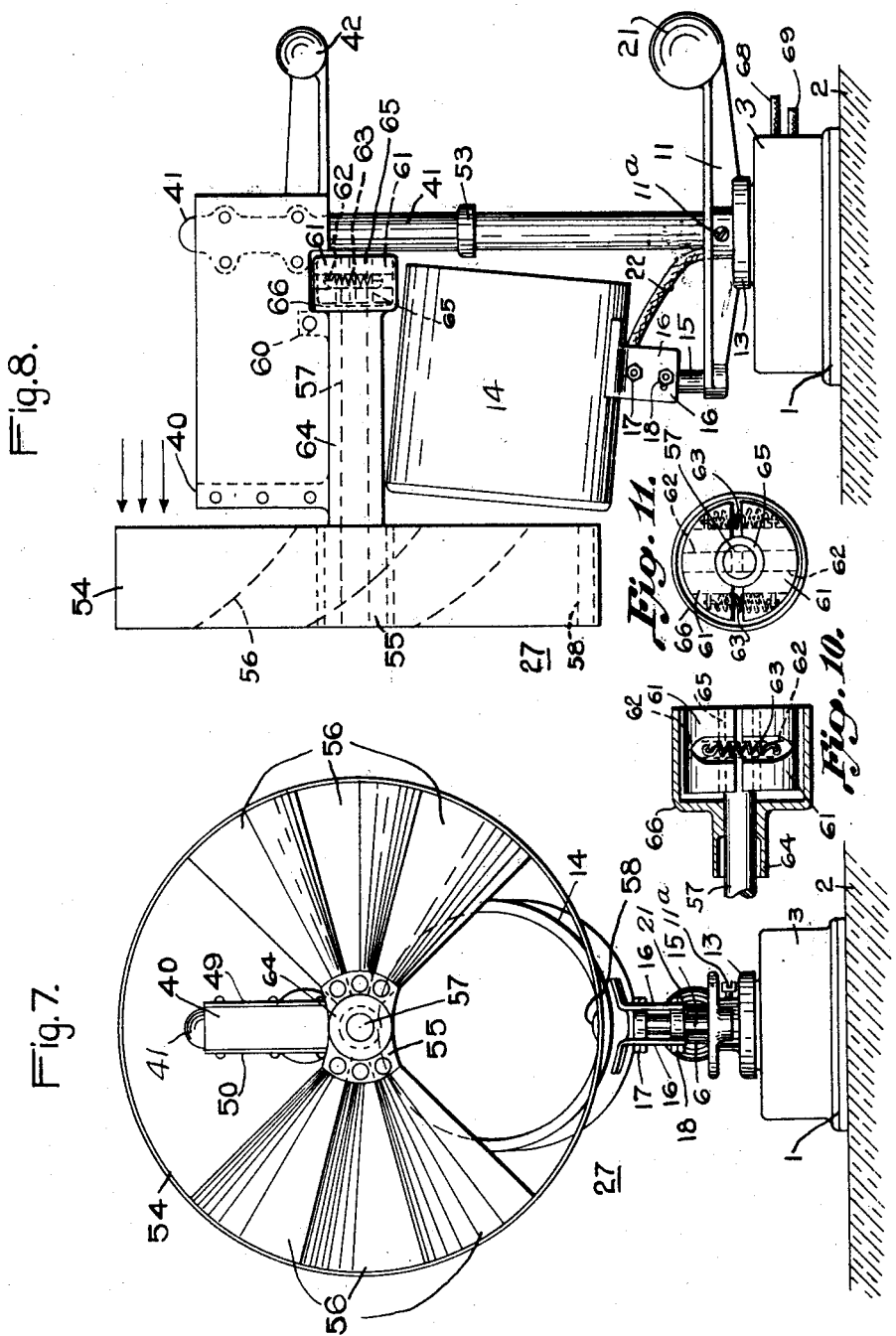
WITNESSES:
INVENTOR
Oscar Werner.
BY
ATTORNEY

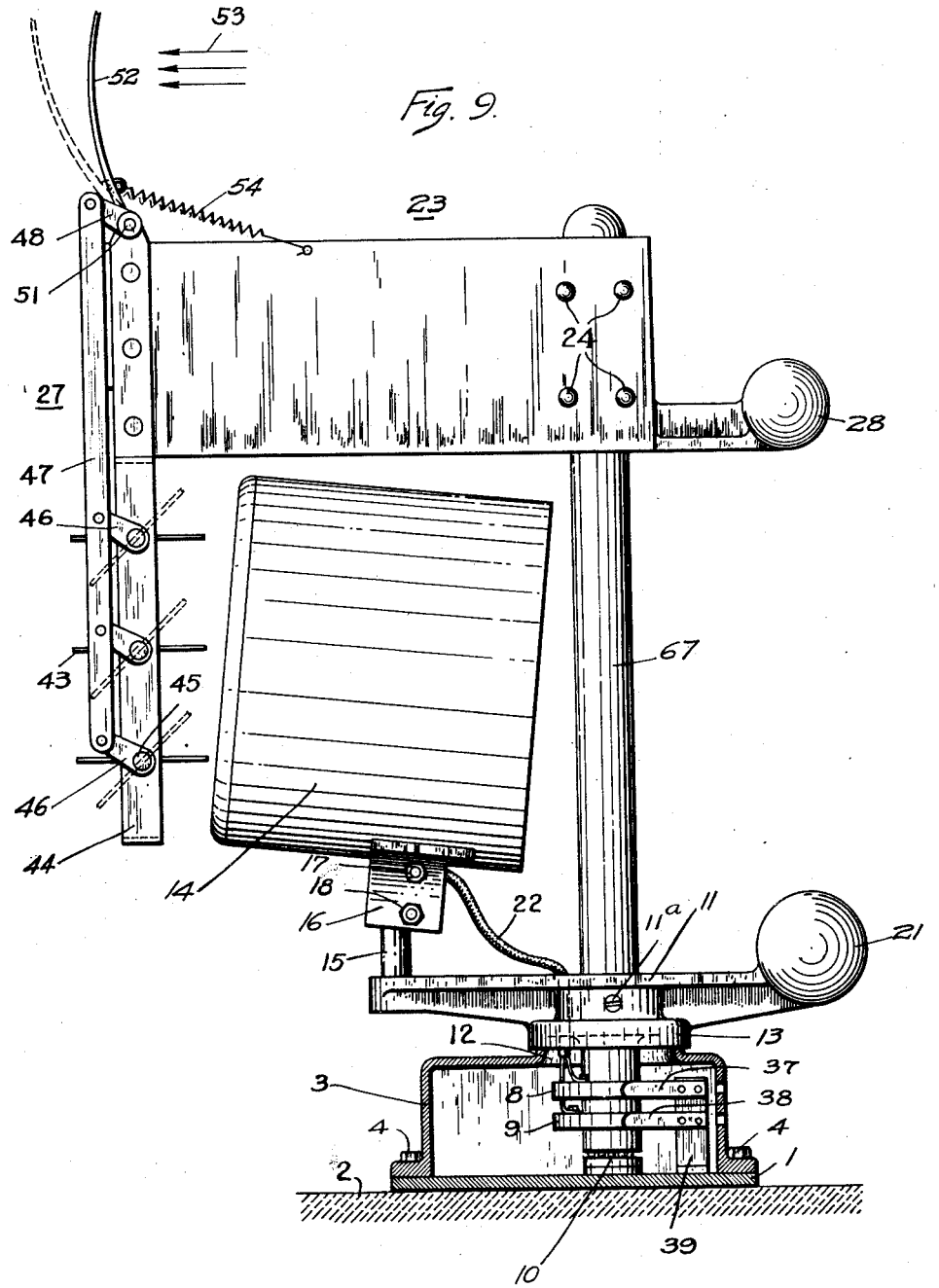

Patented Aug. 30, 1932

1,874,214

UNITED STATES PATENT OFFICE

OSCAR WERNER, OF SOUTH BEND, INDIANA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA

BEACON AND AIR CURRENT INDICATOR

Application filed November 30, 1926. Serial No. 151,770.

My invention relates to lighting fixtures and has particular reference to lighting devices for air-ports and the like.

I contemplate utilizing the beam from a rotating beacon to indicate the wind condition in the vicinity of the beacon to an observer, by means of interruption of the beam.

One of the objects of my invention is to provide means for indicating to an observer, while he is some distance away, the position of the field, the direction of the wind at the field and its relative velocity.

A further object of my invention is to provide a device of the above-indicated character which shall be simple, rugged, easily erected and relatively low in cost and maintenance.

It is common practice in air-port lighting to employ a rotating beacon to designate the location of the landing field. The beacon is essentially a powerful searchlight or projector rotatably mounted in such manner that the beam will be projected at a few degrees above the horizontal. The projector may be rotated, by mechanical means, in a horizontal plane at a slow, uniform speed, so that the beam will sweep the horizon and its light will strike an approaching aviator's eyes. By this means, the aviator is enabled to ascertain the location of the landing field. It is also desirable that the aviator know the direction of the wind current in the immediate vicinity of the field in order that he may make his landing against the wind.

The wind direction is usually indicated by a cloth bag, arranged to swing freely with the wind, and the bag may be illuminated by the light from a number of lamps, reflected from above. Such an air-current indicator is rather indistinct and unsatisfactory, as it can be seen from only a short distance from the field.

My invention provides means whereby the powerful beam from a rotating beacon is utilized, not only to convey information to the aviator regarding the location of the field, but also the direction of the wind and the velocity of the wind in the vicinity of the field. The device is simple and rugged and allows the combination of rotating beacon and air-current indicator in one unit.

My invention may best be understood by reference to the accompanying drawings, in which Fig. 1 is a view, partly in cross-section and partly in side elevation, showing one modification of my device;

Fig. 2 is a top plan view of the device shown in Fig. 1;

Fig. 3 is a view in horizontal section, taken along the line III—III of Fig. 1, showing details of the driving mechanism partly in section and partly in elevation;

Fig. 4 is an enlarged view, in side elevation, of the driving mechanism shown in Fig. 1;

Fig. 5 is a view, in front elevation, of another modification of my device;

Fig. 6 is a view, in side elevation, of the device shown in Fig. 5;

Fig. 7 is a view, in front elevation, of still another modification of my device;

Fig. 8 is a view, in side elevation, of the device shown in Fig. 7;

Fig. 9 is a view, in side elevation, of still another modification of my device;

Fig. 10 is a side elevation view, partially in section, of the centrifugal brake utilized in connection with the device shown in Fig. 8, and Fig. 11 is an end elevational view of the structure shown in Fig. 10.

Referring to Figs. 1 and 2, my device comprises a base member or plate 1 suitably anchored on a foundation 2. The base plate is provided with suitable threaded openings for anchoring a casing 3 thereto by means of bolts 4.

To the base is fixed a stationary shaft or post 5. A hollow shaft or sleeve 6 is loosely fitted on shaft 5 to turn freely thereon and rests on suitable bearings 10 in the base plate. A worm-wheel 7, slip rings 8 and 9, and the projector support 11 are rigidly mounted on the sleeve 6, near the base thereof. A set-screw 11a is provided, as shown, to secure the projector support 11 to the sleeve 6 and any suitable means may be used to secure the worm-wheel 7 and slip rings 8 and 9 thereto.

The casing 3 encloses the driving and commutating members and its top wall is provided with a flanged opening 12, which is adapted to be closed by means of the sleeve member 6 and a cap 13.

The projector 14 is mounted on an upright 15, which is a part of the supporting member 11. A bracket 16 is fixed to the projector and is shaped to loosely receive the upright 15. Bolts 17 and 18 clamp the bracket on the upright. The opening for bolt 18 is slotted to permit a small vertical adjustment of the projector 14.

In order to minimize friction, a suitable weight 21 forms a part of the projector support 11 and counterbalances the weight of the projector 14. Electrical connection is made with a light source in the projector by means of a cable 22, one lead of which is fastened to the slip ring 8 and the other to slip ring 9, through an opening 20 in slip ring 8, shown in Fig. 4.

A weather or wind vane 23 is mounted on an elongated bearing 23a on the post 5 and is rotatably supported by a ball 30, bearing on the upper end of post 5. The vane 23 is adapted to rotate independently from the projector. A collar 53, provided with a downwardly extending flange, acts as a water shed for the junction of sleeve 6 and bearing 23a. The ends of the wings 25 and 26 of the weather vane are secured to the elongated bearing 23a by means of rivets or bolts 24, and the opposite ends of the wings are preferably spread apart, forming a V-shaped vane to provide a substantial support for a screen 27 which is attached to the vane by means of bolts 19. The vane is counterbalanced by means of a weight 28 on the bearing 23a.

The screen 27 is disposed on the weather vane; so that it will extend over the light aperture of the projector 14 and intercept the light ray from the projector whenever the projector, in its rotation about the axis of shaft 5, points in the leeward direction.

The shutter, screen or interference device 27 may be composed of transparent or translucent material, such as ruby or other colored glass, or it may be composed of a sheet of an opaque material or of shutters of an opaque or transparent material.

The projector is positively actuated, in its rotation around the axis of shaft 5, by a motor 29 which is located within the casing 3 for driving the worm gear-wheel 7.

Referring to Figs. 3 and 4, the beacon-rotating or driving mechanism comprises the sleeve 6 for supporting the projector 14, the sleeve being rotated about the post 5 by means of electric motor 29 which is mounted on the base 1. Sleeve 6, attached to the collar 13 which closes the flanged opening 12, is actuated by motor 29 thru pinion 31, gear-wheel 32, worm 36 and worm wheel 7, the latter being rigidly attached to sleeve 6. The spur gear-wheel 32, mounted on shaft 33, is supported on the base 1 by means of bearings 34 and 35. The shaft 33 also carries worm 36. Brushes 37 and 38 are fastened to an insulating block 39 and are connected to supply leads 68 and 69 for carrying current to the slip rings 8 and 9.

It may be easily understood that a wind current will move the wind vane 23 to some such position as shown in Figs. 1 and 2. The beam of light from projector 14 will sweep the horizon in the usual way but, on reaching the position shown in Figs. 1 and 2, the beam is interrupted by the screen and its character is changed. From this change in the character of the beam, the aviator is enabled to determine the wind direction in the vicinity of the beacon. It is not necessary that the pilot be approaching the beacon against the wind and thus be directly in the path of the modified beam in order to determine the wind direction; but, when fairly close, he is enabled to accurately judge the wind direction by watching the beam as it sweeps the horizon. When a change in the character of the beam occurs in a certain direction, he knows that the wind is in that direction.

Other beam modifiers or screens are shown in Figs. 5, 6, 7 and 8. The construction is the same as that shown in Figs. 1, 2, 3, and 4 with the exception of the vane, and the screen or interference device, which is adapted to modify the character of the beam to indicate wind velocity, as well as wind direction, a desirable additional feature.

The screen shown in Figs. 5 and 6 comprises a plurality of shutters 43 of opaque, translucent or transparent clear or colored material mounted in a frame 44. The ends of the shutters are provided with pins or shafts 45 which are rotatably mounted in openings in the frame. The shutters 43 are actuated by arms 46 attached to one end of each of the shafts. The outer ends of the arms are connected by a tie-rod 47. At its upper end, the tie-rod 47 is journaled to crank 48 which, in turn, is fastened to a shaft 51. The shutters are actuated by a wind plate 52 which is rigidly mounted on the shaft 51 and is biased against the force of a wind current by a spring 54, one end of which is secured to the wind vane 23.

In practice, the wind vane will be rotated on the shaft 5 and directed by a wind current in accordance with the direction thereof. Therefore, the wind plate 52 will be at right angles to the direction of the wind current, as indicated by the arrows 53. The pressure of the wind current will cause the wind plate to move outwardly against the spring 54. Consequently, the wind plate 52 will assume a position such as that shown by dotted lines, which position will vary in accordance with the velocity of the wind. By reason of the linkage between wind plate 52 and shutters 43, the shutters will assume a corresponding position, as indicated by dotted lines, and will be closed more or less as the velocity of the wind is greater or smaller. Therefore, the shutters will be positioned to modify a portion of the light from the projector, the amount of light modified being dependent upon the position of the wind plate 52, as determined by the wind pressure thereon.

By this means, the aviator can determine the wind direction and the velocity of the wind by an estimate of the character of the beam. A colored beam or a less intense beam, during a portion of the circuit of the beam, indicates the direction of the wind, and the relative depth of color of the beam or degree of interference by the shutters will appraise the aviator of the relative velocity of the wind current. If red glass be utilized for the shutters, a red beam would indicate a strong wind; a pink beam, a moderate wind; and a white beam, absence of wind; the relative amount of red in the beam indicating the pressure and, therefore, the wind velocity.

Another modification of my device shown in Figs. 7 and 8 comprises a wind vane embodying two essentially parallel plates 49 and 50 mounted on an elongated bearing 41 and adapted to turn with the wind. Plates 49 and 50 support a horizontal bearing sleeve 64 by means of brackets 40 and 60 mounted thereon. An arm, bearing weight 42, is provided to balance the weight of the fan mechanism.

The shuttering means is a fan comprising a metal frame 54 and a hub 55 on which are fixed a plurality of blades 56. The vane and fan are so disposed with relation to the projector that, when the projector has rotated to some such position as shown in Figs. 7 and 8, the fan, when rotating, will modify the light beam.

The fan hub 55 is mounted on a shaft 57, supported within sleeve 64, and the shaft carries the rotating parts of a centrifugal brake, as hereinafter described in detail. Bearing sleeve 65 supports the inner end of the shaft. The blades occupy about one half of the total projected area of the fan, leaving two open sections, each of substantially one-quarter of the total area. The blades 56 are similar to the blades of a windmill, so that the air current may pass between them and, in doing so, will rotate the fan, but they overlap one another so that the beam from the projector cannot pass through them when they are positioned in front of the projector. A small weight 58 is fastened to the rim 54 of the fan at a position in one open section equally distant from the two adjacent fan-blade edges. Until the wind attains a predetermined velocity, the weight 58 on the rim overbalances the force of the wind against the fan blades 56 and will prevent the fan from rotating, because the pressure will not be great enough to raise the weight against the force of gravity. When a predetermined minimum value of velocity of wind is reached, the fan will begin to revolve. The blades and open spaces of the fan traverse the beam projected from the beacon as the fan revolves, and they thereby produce alternate periods of light and darkness. The periodicity is discernible as a flickering of the light, the rapidity of flickering indicating the relative velocity of the air current.

In air currents of extreme velocity, as in a storm, the fan may rotate so rapidly that the flicker is no longer discernible to the naked eye. In order to prevent the fan from running beyond such critical speed, a centrifugal brake (Figs. 10 and 11) is mounted on the inner end of the shaft 57. The brakes comprise weights 61, slotted on pins 62 radially projecting from the shaft 57. Normally, the weights will be drawn in toward the center of the shaft by springs 63 and will rest against the shaft-bushing 65. When the critical speed is reached, the centrifugal force of the weights will overcome the tension of the springs and the weights will fly out against the brake drum 66 to act as brake shoes, thus preventing the fan from exceeding the critical speed. It will be understood that any other suitable form of brake may be employed in lieu of that illustrated.

Although I have described certain modifications of my device, I do not wish to be limited thereto. For instance, the device may be used merely for the purpose of indicating the direction and strength of the wind, without acting as a rotating beacon. For this purpose, the rotating mechanism in the base, such as the illustrated motor, worm and worm wheel may be eliminated and sleeve 6, in Fig. 1, supporting the projector, and elongated bearing 23a, supporting the weather vane, may be rigidly connected, to constitute a shaft 67, Fig. 9. The screen 44 is located directly in front of the projector so that the screen modifies the beam and so that the projector moves with the weather vane and always points in the direction of the wind. Fig. 9 utilizes the beam-modified mechanism shown in Figs. 5 and 6, but any of the beam-modifier mechanisms may be utilized. If so modified, the direction of the beam would, at all times, indicate the direction of the wind, and the altered appearance of the beam would indicate the strength of the wind. The mechanism may be otherwise changed without departing from the scope and spirit of my invention, as set forth in the appended claims.

I claim as my invention:

1. In combination, a movably mounted projector provided with a source of light and disposed to project a substantially horizontal light beam, means for actuating the projector to shift the beam, an independently movable screen for interrupting the light beam, a wind vane responsive to air currents disposed to move the screen and interrupt the light beam at different points in its path of travel.

2. A beacon for projecting a light beam comprising, in combination, a beam-projecting means and adjustable translucent colored shutter means responsive to air currents for controlling the amount of coloring of the beam to transmit information regarding the said air currents.

3. A beacon for projecting a shifting light beam, comprising, in combination, rotatable beam-projecting means and means responsive to air currents for controlling the degree of coloring and the configuration of said beam to transmit information regarding air currents at the beacon.

4. A beacon comprising, in combination, a projector for projecting a light beam, a screen adapted to be positioned in the light beam and provided with movable shutters and an air-pressure-operated plate for controlling the position of the shutters to modify the light beam in accordance with the air pressure.

5. A beacon comprising, in combination, a wind vane, a projector for projecting a light beam and a rotatably and independently mounted screen operatively connected to the wind vane and adapted to be positioned thereby in and out of the light beam in accordance with the direction of the wind.

6. A rotatable beacon for projecting a light beam so directed as to be swept, by rotation of the beacon, about the axis of the latter, a device comprising a shutter for locally intercepting the beam in its sweep, said device being independently adjustable about the source of the beam so as to correspondingly shift the location of the eliminated sector of its sweep, and a wind vane for controlling the adjustment of said device.

7. In combination with a rotatable light beam projector adapted to so direct the beam that rotation of the projector will correspondingly sweep the beam about the axis of the projector, of a vane operable by air currents so as to be positioned thereby in accordance with the direction of said currents and a screen on said vane adapted to intercept said beam during a portion of its rotating movement and thus give an indication of the direction of said currents.

8. The combination with a rotatable light beam projector adapted to so direct the beam that rotation of the projector will correspondingly sweep the beam about the axis of the projector, of a vane operable by air currents so as to be positioned thereby in accordance with the direction of said currents and a screen on said vane adapted to intercept said beam during a portion of its rotating movement and thus give an indication of the direction of said currents, said screen in addition being adjustable in such a manner as to modify the beam when intercepted, and wind-pressure-responsive means for adjusting the screen in accordance with the wind pressure.

9. In combination, a rotatable beam projecting beacon including a housing therefor, a wind vane, a movable screen attached to said wind vane and positioned in the path of said beam and controlled in its movement by said wind vane, moving parts within said screen, means for effecting the movement of said parts in varying degrees in accordance with wind velocity, said screen being adapted to indicate wind direction by intercepting said beam at a point determined by the wind acting through the medium of said wind vane and wind velocity by the effect of the position of its internal moving parts on the intensity of the beam.

10. A rotatable beacon in combination with a system of shutters adapted to be opened and closed and rotatable about said beacon to interrupt the light of the beacon, a wind vane for controlling the angular position of said system of shutters, and wind-pressure-operated means for regulating the opening and closing of the shutters to indicate the velocity of the wind.

11. The combination with a rotatable light-beam projector adapted to so direct the beam that rotation of the projector will correspondingly sweep the beam about the axis of the projector and means for positively rotating said projector, of a vane adapted to rotate freely and to be positioned in accordance with the direction of air currents impinging thereon and means associated with said vane for altering the light beam projected from said light source during a portion of its rotary sweep.

12. An indicating device comprising a rotatably mounted beacon projecting a beam of light, said beacon being adapted to be rotated about a vertical axis, said beam being projected away from the axis of rotation, a wind vane and a freely rotatable screen operatively connected to the wind vane and adapted, by means of the vane, to be positioned in accordance with the wind in the path of the beam to modify the said beam to indicate wind direction.

13. An indicating device comprising a rotatably mounted beacon projecting a beam of light away from the axis of rotation of the beacon, a wind vane and a rotatable screen, said wind vane supporting said screen and allowing it to be rotated and to be placed in the path of the beam, said screen being adapted to modify the projected beam at certain points in accordance with the wind direction.

14. An indicating device comprising a rotatable beacon projecting a beam of light away from the axis of rotation of the beacon, means for rotating the beacon, a wind vane and a screen attached to said wind vane adapted to be positioned by the wind acting on the wind vane in the path of the beam, thereby modifying the projected beam at certain points to indicate wind direction.

15. An indicating device comprising a beacon projecting a beam of light and adapted to be rotated about a vertical axis, means for rotating the beacon, said beam being projected away from the axis of rotation of said beam, and a wind vane and screen mounted on the same axis and said screen adapted to be positioned in the path of the beam in accordance with the wind direction to modify the projected beam to indicate the wind direction to an observer.

16. An indicating device comprising a light projector adapted to be rotated about a vertical axis and to project a substantially horizontal beam, means for rotating the projector, a wind vane disposed above the projector and adapted to freely rotate about the same vertical axis and a screen mounted on one end of the vane and projecting downwardly so that the beam from the projector is modified when it comes into register with the screen to indicate wind direction.

17. An indicating device comprising a standard, a light projector rotatably mounted on the lower portion of the standard and adapted to project a light beam away from the standard, a combined air vane and screen independently and rotatably mounted on the upper portion of the standard, said screen projecting downward so as to intercept the light from the projector.

18. An indicating device comprising a standard, a sleeve rotatably mounted on the lower portion of the standard, a projector support mounted on the sleeve, a light projector mounted on the support, an air vane independently rotatably mounted on the upper portion of the standard and a screen mounted on the air vane for modifying the light from the projector.

19. An indicating device comprising a standard, a sleeve rotatably mounted on the lower portion of the standard, a projector support mounted on the sleeve, a projector mounted on the support, a bearing member rotatably mounted on the upper portion of the standard, a wind vane mounted on the bearing member and a screen mounted on the wind vane, said screen projecting downwardly so as to intercept light from the projector.

20. A revoluble beacon for projecting a beam of light revolving in a constant plane for transmitting intelligence to an observer, means for actuating the beacon, revoluble means responsive to wind direction and means for decreasing the intensity of the light projected by said beacon at a point in its travel corresponding to wind direction in direct proportion to increases in the wind velocity, comprising a screen projecting into the path of the beam at all times at a substantial angle thereto, said screen including movable members, means adjustable by wind velocity for moving said members and for thereby grading the amount of light projected by said beacon and operatively connected to and positioned in the beam path by said wind-direction responsive means.

21. A signal for indicating the direction and velocity of the wind comprising, in combination, a revolubly mounted screen, movable parts contained within said screen, means for moving the parts of the screen per se in accordance with wind velocity, wind-direction responsive means for positioning the screen in the direction corresponding to the wind direction, a rotatably mounted light source adapted to project a light beam away from the axis of rotation of the light source and about which the screen revolves, said screen being positioned at a substantial angle to the plane of the light beam, and means for rotating the light source whereby said signal is indicated each time the beam of light passes through said screen.

In testimony whereof, I have hereunto subscribed my name this 24th day of November, 1926.

OSCAR WERNER.